United States Patent [19]
Stock et al.

[11] Patent Number: 5,303,749
[45] Date of Patent: Apr. 19, 1994

[54] GAS CYLINDER HANDLING PROCESS AND ASSEMBLY

[75] Inventors: James H. Stock, Wixom, Mich.; Philip C. Bettiker, Deerfield, Ill.

[73] Assignee: Cylinder Laboratories, Romulus, Mich.

[21] Appl. No.: 837,043

[22] Filed: Feb. 18, 1992

[51] Int. Cl.$^5$ .............................................. B67B 7/24
[52] U.S. Cl. .......................................... 141/4; 30/448; 222/86; 222/397; 141/51; 141/65; 141/83; 141/97; 141/329
[58] Field of Search ........................................ 141/4-8, 141/65, 51, 52, 83, 97, 329, 330, 311 R, 319, 368, 231; 157/13, 1; 222/81-83, 83.5, 85, 86, 397; 414/412; 30/401-403, 444, 448, 400; 252/633

[56] References Cited

U.S. PATENT DOCUMENTS

Re. 33,799 1/1992 Gold et al. .......................... 222/397

Primary Examiner—Frank Sever
Attorney, Agent, or Firm—Reising, Ethington, Barnard, Perry & Milton

[57] ABSTRACT

A method and assembly for treating hazardous and/or unknown fluids either liquids or compressed gases contained in a gas cylinder (12) having a cylinder body (14) and a removable fixture (16). The assembly (10) includes a tubular housing (18) having an open end (20). An adjustable carriage assembly (34, 38, 40) is included for supporting the cylinder body (14) in the center of the housing (18). A clamping assembly (30) secures the cylinder body (14) to the carriage assembly (34, 38, 42). An end cap (70) seals the open end (20) of the housing (18). A shaft (72) is rotatably disposed through the end cap (70). The shaft (72) includes a fixture engagement assembly (78) on one end (76) thereof for engaging a portion of the fixture (16) and imparting a rotational force thereto. A motor driven gear box (86) imparts the rotational force to another end (74) of the shaft (72). Gas or fluid removed from the cylinder body (14) exits the housing (18) through an opening (94) and is treated in a scrubber assembly (96) comprising a treatment tank (104) and a packed column (106).

22 Claims, 4 Drawing Sheets

GAS CYLINDER HANDLING PROCESS AND ASSEMBLY

BACKGROUND OF THE INVENTION

1. Field of the Invention

The present invention relates to a method and assembly for removing fixtures from gas cylinders and for treating known or unknown fluids of either liquids or compressed gasses contained within the cylinder in an environmentally safe manner.

2. Prior Art

Gas cylinders having removable fixtures, such as valves are commonly used for many purposes. Problems existing are that some cylinders are not marked, are corroded beyond recognition and/or contain hazardous fluids. Disposal of these cylinders and more particularly, the fluid in them has been a problem. previously, these cylinders were taken to a remote location and breached such as by shooting them. The penetration released any fluid contained in the cylinder to render them harmless. However, regulations now prohibit such treatment of the fluid in the cylinders.

Applicant is generally aware of one apparatus of the type for treating fluids comprising either liquids and/or gasses contained in a gas cylinder. Generally, the apparatus includes a housing for enclosing a gas cylinder having the gas and/or liquid therein. The housing is closed and the assembly has a piercing mechanism for piercing or punching a hole in the gas cylinder to allow the gas to escape and be containerized within the housing. Subsequently, the fluid from within the cylinder is treated. Although applicant is generally aware of this assembly and process, applicant is unaware of the exact configuration of the piercing mechanism or housing. Further, applicant is not specifically aware of the manner in which the fluid is treated.

This prior art device, is deficient in that each time it is used, the gas or fluid cylinder is punctured. Therefore, the cylinder is required to be scrapped after this prior art assembly and method have been used.

SUMMARY OF THE INVENTION AND ADVANTAGES

According to the present invention, there is provided a treatment assembly of the type for treating fluid contained in a gas cylinder of the type which comprises a cylinder body and a removable fixture sealing the cylinder body. The assembly includes a tubular housing having an open end. The assembly further includes support means disposed within the tubular housing for supporting the gas cylinder at a predetermined position relative to the tubular housing. The assembly is characterized by having fixture removal means for sealing one end of the tubular housing and for imparting relative rotational movement between the cylinder body and the removable fixture to thereby remove the fixture from the cylinder body to allow the fluid to exit the gas cylinder into the tubular housing.

The present invention also provides a method for treating fluid contained in a gas cylinder of the type which includes a cylinder body and a removable fixture sealing the cylinder body. The method comprises the step of supporting the cylinder within a tubular housing having an open end. The open end of the tubular housing is sealed. Finally, the method comprises the step of removing the fixture from the cylinder body to allow the fluid to exit the gas cylinder into the tubular housing.

Therefore, according to the present invention there is provided a method and assembly for removing a removable fixture from a cylinder body and containing the fluid therein for treatment in a safe manner. By utilizing this method and assembly, the cylinder body can be reclaimed and reused, that is, it need not necessarily be scrapped. Further, the fluid contained within the cylinder body is recontainerized into a tubular housing and can undergo further treatment in a suitable scrubber assembly in an environmentally safe manner.

FIGURES IN THE DRAWINGS

Other advantages of the present invention will be readily appreciated as the same become better understood by reference to the following detailed description when considered in connection with accompanying drawings wherein.

DETAILED DESCRIPTION OF THE DRAWINGS

A treatment assembly of the type for treating fluid is generally shown at 10 in the figures. As used herein, fluids can comprise either liquids and/or gasses. The assembly 10 is of the type for treating fluids contained in a gas cylinder 12 (best shown in FIG. 1). Gas cylinders of the type to be treated by the present assembly 10 generally comprise a cylinder body 14 and have a removable fixture 16 thereon. The removable fixture 16 seals an open end of the cylinder body 14. That is, the removable fixture 16 is threadedly disposed on the threaded open end of cylinder body 14. Gas cylinders 12 of this type are well known in the art. The cylinder body 14 can come in a variety of sizes and configurations. Likewise, the removable fixture 16 can take a variety of forms and sizes. The cylinder bodies 14 typically contain hazardous, compressed gasses and/or fluids. The fluid contained in the cylinder body 14 typically is gaseous, however, it may in some cases be liquid.

Figure 4:
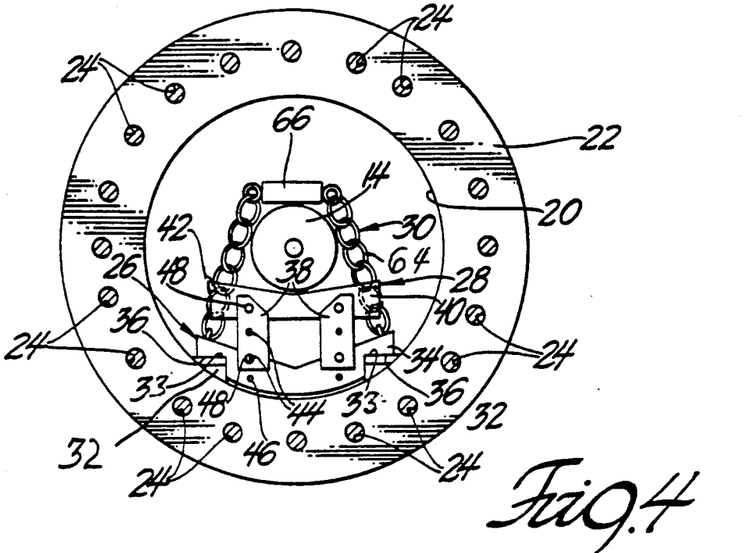
FIG. 4 is an end front view of the tubular housing including the support assembly of the present invention.

The assembly 10 includes a tubular housing 18. The tubular housing 18 has an open end 20. Preferably, the tubular housing 18 comprises a cylinder having one closed end opposite the open end 20. The housing 18 has an opening 19 therein for receiving the gas cylinder 12. The opening 19 is large enough to receive any type of gas cylinder 12. Preferably, the maximum cylinder diameter is eighteen (18) inches. The tubular housing 18 further includes an annular flange 22 disposed about the periphery of the open end 20. The flange 22 has a plurality of holes 24 therethrough (as best seen in FIG. 4). The holes are spaced about the entire annular flange 22.

The tubular housing 18 is preferably made from a metal material that is capable of withstanding high pressures. The tubular housing 18 must be able to withstand unanticipated ignition and perhaps explosion of the fluid material released therein which was originally contained in the gas cylinder 12.

The assembly 10 further includes gas cylinder support means or assembly generally indicated at 26. The gas cylinder supports assembly 26 is disposed within opening 19 of the tubular housing 18 and is for supporting the gas cylinder 12 at a predetermined position relative to tubular housing 18. Specifically, the gas cylinder support assembly 26 is for supporting the gas cylinder 12 in the center of the opening 19 in the tubular housing 18. That is, the cylinder body 14 and therefore the removable fixture 16 threadedly supported thereby are arranged so that the center of the cylinder body 14 and the center or axis of rotation of the removable fixture 16 is coaxial with the longitudinal axis of the tubular housing 18.

The gas cylinder support assembly 26 comprises an adjustable frame support means or assembly generally indicated at 28. The adjustable frame support assembly 28 is for supporting the gas cylinder 14 at the predetermined position relative to the housing 18.

The gas cylinder support assembly 26 further includes a clamping means or assembly generally indicated at 30. The clamping means 30 is operatively associated with the adjustable frame support means 28 for securing the gas cylinder 12 and specifically the cylinder body 14 to the adjustable frame support assembly 28.

The adjustable frame support assembly 28 includes a pair of rails 32 fixedly secured within the opening 19 of the tubular housing 18. The rails 32 extend axially within the opening 19 tubular housing 18. Preferably, the rails are fixedly secured to the bottom portion of the tubular housing 18 and each presents an upwardly facing support surface 33.

The adjustable frame support assembly 28 also includes a carriage slideably disposed on the pair of rails 32. Specifically, the carriage comprises a lower carriage member 34 having a pair of surfaces 36 adapted for mating engagement with the support surface 33 of the rails 32. As shown, the lower carriage member 34 extends the entire length of the carriage. The bottom surface of the lower carriage member 34 of a shape which matingly engages the housing 18 to provide stability. It will be appreciated that the lower carriage member 34 may have a shorter length, in which case two lower carriage members 34, one to support each end of the cylinder body 14, will be needed.

Figure 1:
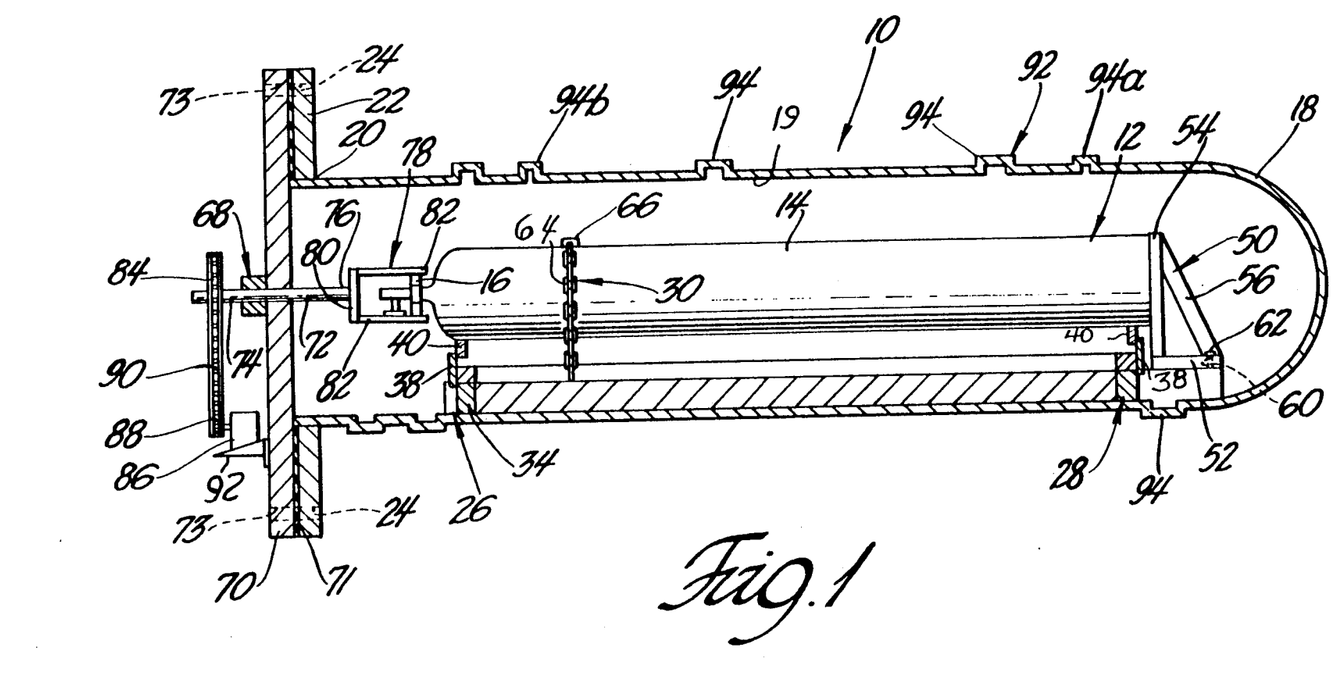
FIG. 1 is a side elevational view of the present invention partially in cross section.
Figure 2:
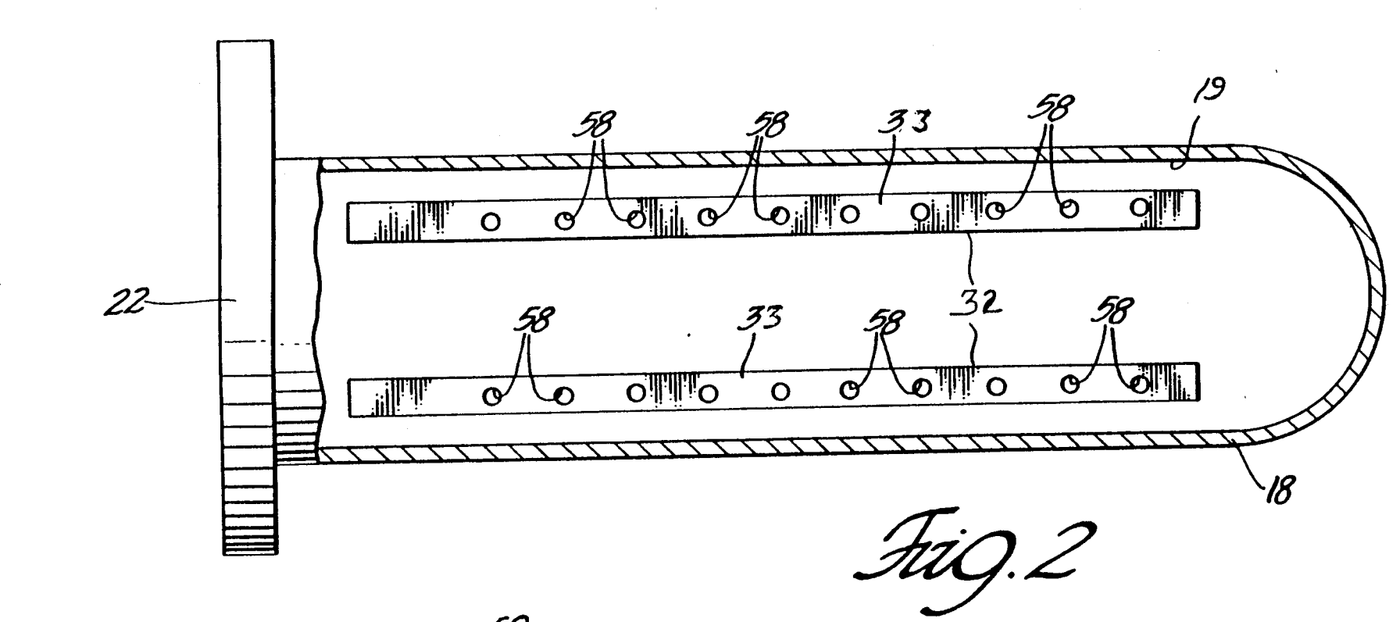
FIG. 2 is a top view of the tubular housing of the present invention partially in cross section.

The carriage further includes a pair of legs 38 extending upwardly from each end the lower carriage member 34 and adjustable relative thereto (FIGS. 1 and 4). The legs 38 comprise flat plates having a plurality of adjustment holes 44 therethrough.

The carriage also includes a pair of upper carriage members 40. One upper carriage member 40 is disposed on each end of the lower carriage member 36. Each upper carriage member 40 is supported by the pair of legs 38 and adjustable relative thereto. The upper carriage member 40 includes a support surface 42 for engaging the gas cylinder body 14. Preferably, the support surface 42 has a V-shape. Because the support surface 42 is V-shaped, it can accommodate many different cylinder bodies 14 having various sizes and shapes. Further, the V-shape will also automatically center the cylinder body 14 with respect to the upper carriage member 40. The reason for this is that the cylinder body 14 is symmetrical and will engage the support surface 42 at two points, each an equal distance from the center of the support surface 42. This ensures that the cylinder body 14 is properly positioned horizontally (i.e. centered) relative to the tubular housing 18.

The legs 38 are adjustable with respect to both the lower carriage member 34 and the upper carriage member 40. That is, the plurality of holes 44 are arranged on the legs 38 at different heights for allowing relative adjustment between the legs 38 and the lower 34 and upper 40 carriage members. Similarly, the lower carriage member 34 has a plurality of holes 46 for allowing relative height adjustment between the legs 38 and the lower carriage member 34. Each of the holes 44 of the legs 38 and the holes 46 of the lower carriage member 34 are aligned to a position so that the cylinder body 14 and, therefore, the removable fixture 16 are centered vertically within the tubular housing 18. Once the legs 38 are in the proper position, a pin 48 is placed through the holes 46, 44 respectively to secure the legs 38 with the lower carriage member 44.

Similarly, the upper carriage member 40 has a plurality of holes (not shown) for receiving pins 48 to secure the legs 38 with the upper carriage member 40. Thus, the height of the carriage and, therefore, the vertical position of the cylinder body 14 within the tubular housing 18 is controlled by adjusting the heights of the legs 38 relative to the lower carriage member 34 and the upper carriage member 40. Once the heights are selected, pins 48 are placed through the holes 44, 46 of the legs, lower carriage member 34, and upper carriage member 48 to lock the legs 38 in the proper position.

To properly select the vertical position of the gas cylinder 12, the diameter of the cylinder body 14 is obtained. The relative height of the carriage is then calculated, and the legs 38 are adjusted relative to both the lower carriage member 34 and the upper carriage member 40. The pins 48 are positioned into the proper holes to lock the legs and therefore the carriage at the appropriate height. This positioning of the V-shaped support surface 42 at the predetermined height results in the proper vertical positioning of the cylinder body 14.

Figure 3:
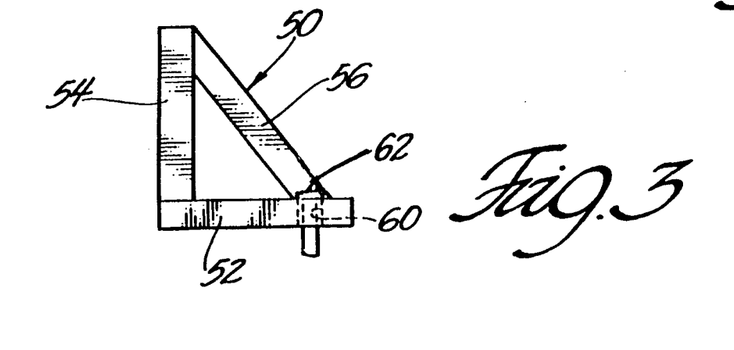
FIG. 3 is a side elevational view of the backstop of the present invention.

The adjustable frame support assembly 28 further includes a backstop means or assembly generally indicated at 50 (FIG. 3). The backstop assembly 50 is for limiting axial movement of the gas cylinder 12 and the one axial direction within the tubular housing 18. Specifically, the backstop assembly 50 comprises a base 52 for engaging the upwardly facing support surfaces 33 of the rails 32. The backstop assembly 50 also includes an upright support 54 extending upwardly from the base 52. The upright support 54 engages the gas cylinder 14 (FIG. 1) to limit axial movement of the gas cylinder 14. That is, the upright support 54 engages the cylinder 14 to prevent rightward movement of the cylinder 14 as viewed in FIG. 1. The backstop assembly 50 also includes a support member 56 extending from the upright support 54 and the base 52 and fixedly secured therebetween to provide structural rigidity.

The rails 32 inside the tubular housing 18 have a plurality of holes 58 disposed along the axial length and through the support surfaces 33 thereof. Further, the base 52 of the backstop assembly 50 has a plurality of holes 60 therethrough. To prevent axial movement of the backstop assembly 50 with respect to the rails 32, the holes 60 in the base 52 are aligned with the corresponding holes 32 in the rails 32. A pair of pins 62 (only one shown) are disposed through the holes 60 in the base and the holes 58 in the rail 32 to thereby lock the backstop assembly 50 with respect to the rails 32.

The clamping means or assembly 30 is best shown in FIGS. 1 and 4. The clamping assembly shown comprises a standard pipe clamp which includes a pair of chain link portions 64 and a solid portion 66 each of the chain link portions 64 extending outwardly from the solid portion 66. The chain link portions 64 are each secured with the lower carriage member 34 on the lower end, and each is secured at its upper end to the solid position 66. The pipe clamp shown operates so as to tighten upon relative rotational movement between the clamp assembly 30 and the cylinder body 14. Therefore, as a rotational force is imparted to the cylinder body 14, the clamp 30 prevents or limits relative rotational movement between the clamp assembly 30 and thereby the frame support assembly 28 and the cylinder body 14.

Although the clamp assembly 30 shown comprises a standard pipe clamp assembly, it will be appreciated that the clamp assembly can take any configuration which is capable of securing the cylinder body 14 to the upper carriage member 40 to prevent relative rotational movement therebetween. For example, the clamp 30 may take the form of a strap secured to the lower carriage member 34 and disposed over the cylinder body 14, and adjustably secured to the lower carriage member 34 on the opposite side of the fixed attachment.

The assembly 10 further includes a fixture removal means or assembly generally indicated at 68. The fixture removal assembly is for sealing the open end 20 of the tubular housing 18. The fixture removal assembly 68 is also for imparting relative rotational movement between the cylinder body 14 and the removable fixture 16 to thereby remove the fixture 16 from the cylinder body 14. Once the fixture 16 has been removed from the body 14, all remaining contents within the cylinder body 14 escapes into the opening 19 of the tubular housing 18 for subsequent treatment.

The fixture removal assembly 68 firstly includes an end cap 70 for sealing the open end 20 of the tubular housing 18. As best shown in FIG. 1, the end cap 70 generally comprises a solid cylindrical disc for sealing the open end 20 of the tubular housing.

The end cap 70 must also be constructed of a material capable of withstanding high pressures. Preferably, the end cap 70 is made of a metal material. A suitable seal 71 is used in conjunction with the end cap 70 and between the end cap 70 and flange 22 to prevent fluid from escaping the housing 18 through the open end 20. Preferably, the seal 71 comprises a gasket or an O-ring seal.

The end cap 70 has a plurality of holes 73 around the periphery thereof. The holes 73 of the end cap 70 align with the holes 24 of the flange 22. In this manner, a plurality of pins (not shown) can extend through the holes 24 of the flange 22 and through the holes 73 about the periphery of the end cap 70 in order to secure the end cap 70 with the flange 22 to close off and seal the open end 20 of the tubular housing 18. Preferably, the pins comprise threaded bolts so that nuts can be used to secure the end cap 70 with the flange 22. Alternatively, hydraulic connections may be used in place of nuts to lock the pins in the holes 24 of the flange 22 and in the holes 73 about the periphery of the end cap 70. It will be appreciated that any suitable means can be used to secure the end cap 70 onto the flange 22 to thereby seal the open end 20 of the housing 18.

The fixture removal assembly 68 also includes a shaft 72 having first 74 and second 76 ends. The shaft 72 is rotatably disposed through the center of the end cap 70. That is, the first end 74 of the shaft 72 is disposed on one side of the end cap to, and the shaft 72 extends through the end cap 70 so that the second end 76 of the shaft 72 is on the opposite side of the end cap 70 and extends into the opening 19 of the tubular housing 18. A suitable seal (not shown) is disposed between the shaft 72 and the end cap 70. The seal permits rotational movement of the shaft 72 relative to the end cap 70, but prevents the escape of any fluid from within the housing 18.

The fixture removal assembly 68 further includes a fixture engagement means or assembly 78 on the second end 76 of the shaft 72. The fixture engagement assembly 78 is for engaging the removable fixture 16 of the gas cylinder (FIG. 1) and for rotating the fixture 16 relative to the cylinder body 14 in response to a force applied to the shaft 72 at the first end 74. The fixture engagement assembly 78 can take various configurations depending upon the type of fixture 16 to be removed. In the example shown in FIG. 1, the fixture engagement assembly 78 comprises a flat plate 80 extending transverse to the longitudinal direction of the shaft 72 with the shaft 72 fixedly secured in the center of the plate 80. The flat plate 80 further has two pairs of flats (only one pair is shown) forming a closed box 82 extending transverse to the plate 80 at the ends thereof. The four flats 82 engage respective surfaces on the fixture 16. Alternatively, the flat plate 80 and flats 82 can be replaced with a socket or any other member having a configuration adapted to receive at least a portion of the removable fixture 16.

Figure 6:
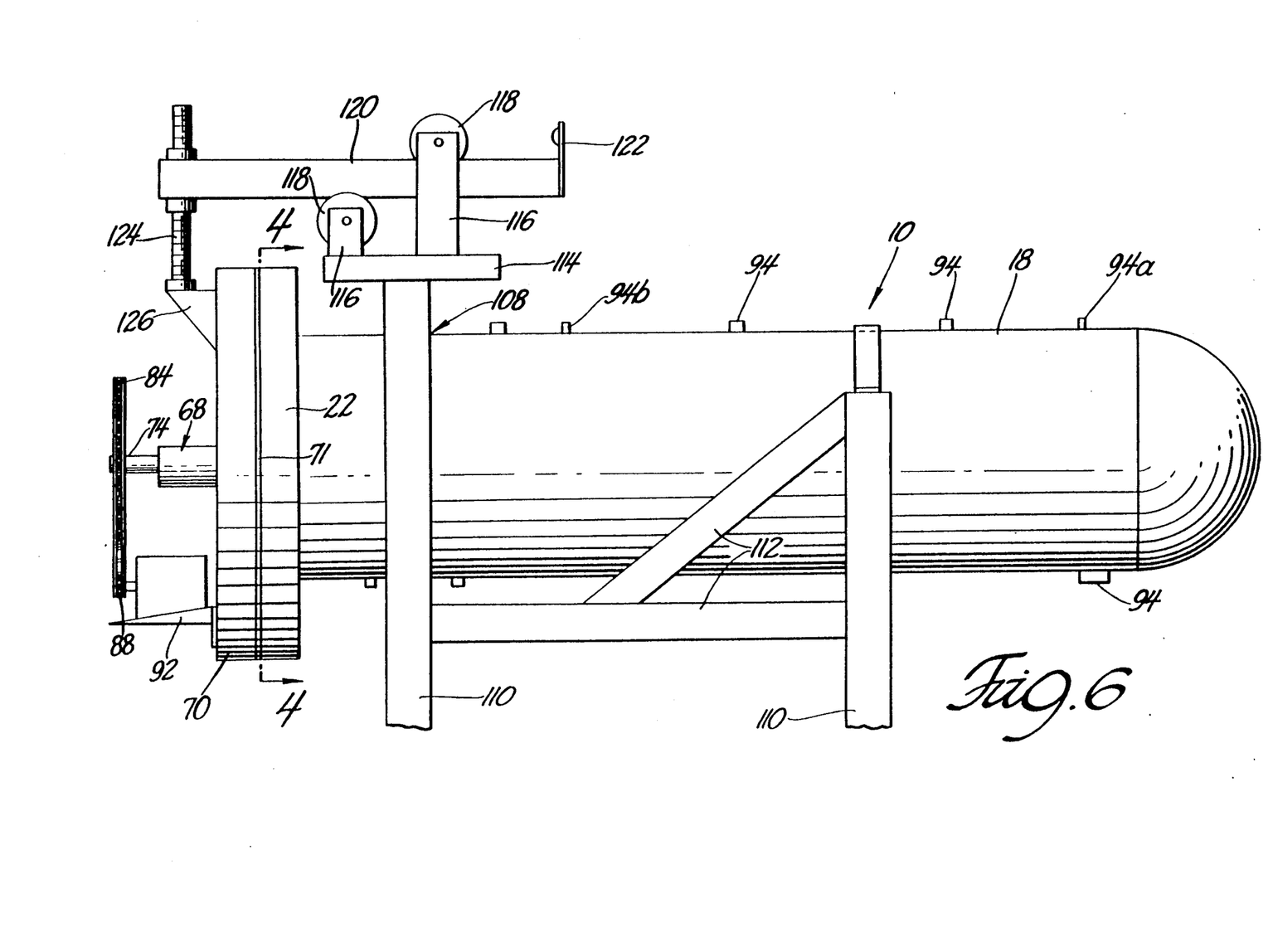
FIG. 6 is a side elevational view of the present assembly.

The first end 74 of the shaft 72 is adapted for receiving a rotational force. As best shown in FIGS. 1 and 6, the first end of the shaft is connected to a pulley or sprocket 84. The pulley or sprocket 84 is adapted to receive a force from a motor driven gear box assembly 86. The assembly 86, and more specifically, the output shaft thereof is connected to a smaller pulley or sprocket 88. The smaller sprocket 88 and the larger sprocket 84 are interconnected by a belt or chain 90. Therefore, when the motor driven gear box 86 is energized, the output shaft rotates, thereby rotating the smaller sprocket 88. The smaller sprocket 88 imparts a force to the belt or chain 90 which in turn rotates the larger sprocket 84. Because the larger sprocket 84 is fixedly secured to the first end 74 of the shaft 72, the shaft 72 rotates in response to such a force. This rotational force is in turn, imparted through the fixture engagement assembly 78 to the fixture 16. Because the cylinder body 14 is secured by the clamp 30, rotational movement of the cylinder body 14 is restricted. Therefore, the majority of the force applied by the motor driven gear box 86 to the shaft 72 is used to rotate the removable fixture 16 relative to the cylinder body 14 to thereby remove the fixture 16 from the cylinder body 14.

Figure 5:
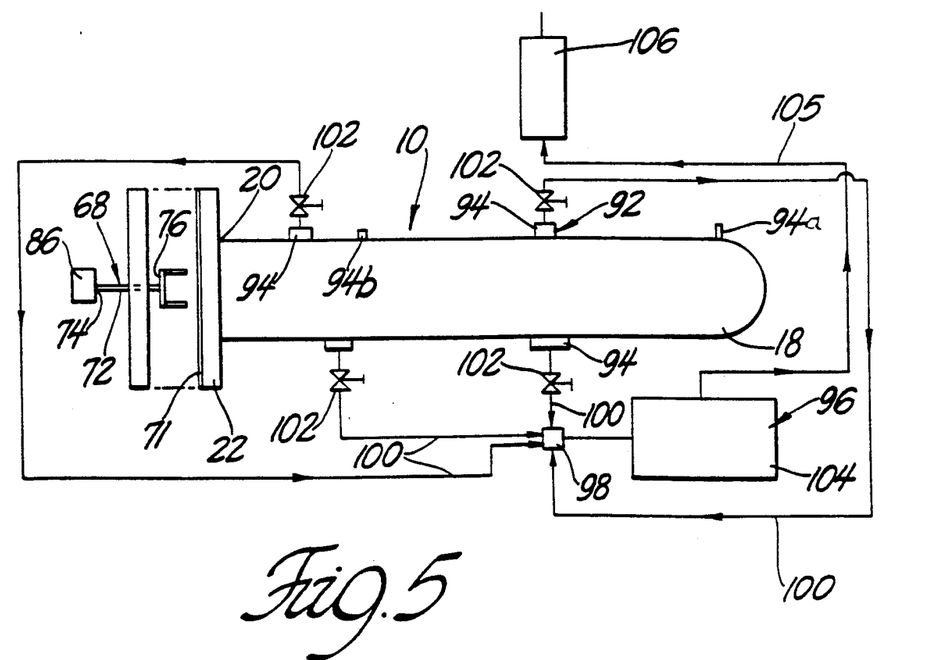
FIG. 5 is a schematic view of the present assembly.

In the preferred embodiment, the motor driven gear box 86 is supported by a support flange 92 fixedly secured to the end cap 70. It will be appreciated that the shaft of the motor driven gear box 86 can be directly connected to the shaft 72 (as shown schematically in FIG. 5). If this is the case, no sprockets 84, 88, or belt 90 is required. Because sprockets 84, 88 are used, a mechanical advantage is utilized to impart a greater force to the removable fixture 16.

The assembly 10 further includes a fluid removal means or assembly , generally indicated at 92. The fluid removal assembly 92 is operatively associated with the tubular housing and is for removing fluid from the tubular housing 18. That is, once the fixture 16 has been removed from the cylinder body 14, all the fluid originally contained in the cylinder body 14 escapes the cylinder body 14 and is captured within the tubular housing 18. Therefore, the housing 18 includes the fluid removal means 92 which allows the fluid to be removed from the tubular housing and treated in a safe manner. The fluid removal assembly 92 comprises a plurality of openings 94 through the tubular housing 18. The openings 94 are closed (such as by a valve) when not in use and can be opened when used to evacuate the fluid from the interior of the housing 18. The openings 94 are located on both the top and bottom of the housing 18. Most gasses can be evacuated or removed from the housing 18 through the openings 94 on the top of the housing 18. If the fluid is a liquid it must be removed through an opening 94 on the bottom of the housing 18. One or more of the openings 94 can also be used as a sampling port 94a to withdraw a sample of the fluid from the opening 19 of the housing 18 without exposing the fluid in the housing 18 to the atmosphere.

Another one of the openings 94 can be used as a gas inlet 94b. Prior to removing the fixture 16 from the cylinder body 14, it is oftentimes desirable to introduce an oxygen free atmosphere, such as a nitrogen atmosphere, into the opening 19. This prevents the risk of explosion by excluding oxygen. This gas is introduced through a gas inlet 94b.

The gas removal assembly 92 further includes a scrubber means or assembly generally indicated schematically at 96. The scrubber assembly 96 is in fluid communication with the openings 94 for receiving the fluids from the tubular housing 18 and for treating the fluid therein. Firstly, the scrubber assembly includes a valve 98 for receiving a conduit or several conduits 100 connected to the various openings 94 of the housing 18. Flow through the conduits 100 is controlled by valves 102 connected to each individual conduit 100. Although four conduits 100 and valves 102 are shown, it will be appreciated that any number of conduits 100 and valves 102 may be utilized. Further, each conduit 100 is shown to lead to a single scrubber assembly 96. Although this is preferred, each conduit 100 could lead to a separate scrubber assembly, each for treating a different type of fluid.

The valve 98 is connected to the treatment tank 104. Thus, the treatment tank 104 is in fluid communication with the openings 94 in the housing 18. The treatment tank 104 is preferably filled with a liquid and the fluid from the interior of the housing 18 which is transmitted through the conduit 100 to the treatment tank 104 is passed through the liquid contained therein. Typically, the fluid in the housing 18 from the cylinder 12 is gaseous, and the gas is bubbled through the liquid contained in the treatment tank 104. The type of liquid in the treatment tank is dependent upon the contents from the housing 18 to be treated. By way of example, if the fluid is acidic, HCL gas, for example, then the liquid in the treatment tank 104 will be a base, for example, NaOH. It will be appreciated that once the content of the fluid contained in the housing 18 is known, by drawing off a sample through a sampling port 94 and testing it in a remote testing apparatus, the appropriate liquid can be placed in the treatment tank 104 for treating the fluid.

The scrubber assembly 96 also includes a packed column 106 in communication with the treatment tank 104 through a conduit 105. The packed column 106 is for treating any residual gases which escape treatment in the treatment tank 104. In this manner, all of the environmentally or otherwise harmful residue of the tubular housing 18 is treated and reduced to environmentally safe components. Again, the content of the packed column is determined by the fluid to be treated.

The assembly 10 also includes a suitable support structure for supporting the tubular housing 18 and fixture removal assembly 68. The support structure is generally indicated at 108 in FIG. 6. The support structure 108 can take any configuration. Preferably, the support structure 108 includes a plurality of legs 110 for supporting the tubular housing at a position above the ground. Structure elements 112 are also used to provide rigidity to the legs 110. A pair of cross members (not shown) are secured between the legs 110 to provide support to the housing 18 and to provide further support for the legs 110. Preferably, one of the legs 110 has a turntable 114 rotatably mounted on the top thereof.

A pair of roller arms 116 extend upwardly from the turntable 114 and are fixedly secured thereto. A pair of rollers 118 are rotatably mounted on the tops of the roller arms 116 respectively. A connecting arm 120 is supported for axial sliding movement between the rollers 118. The rollers 118 are configured so as to prevent rotational movement of the connecting arm 120. Axial movement of the connecting arm 120 is limited in one direction by a flange 122 fixedly secured on one end of the connecting arm 120. The flange 122 engages the roller 118 when the arm 120 is fully extended (to the left in FIG. 6) to prevent further axial movement of the connecting arm 120.

The opposite end of the connecting arm 120 has a threaded projection 124 threadedly secured thereto. The threaded projection 124 is secured to a connection assembly 126 on the end cap 70. Therefore, when connected, the connecting arm 120, threaded projection 124 and connection assembly 126 form an integral assembly to support the end cap 70 (as shown in FIG. 6).

The integral assembly is used to facilitate connection and removal of the end cap 70 from the flange 22 of the housing 18. Specifically, the end cap 70 is extremely heavy. Because of its weight, the end cap 70 is difficult to maneuver when either connecting it to or removing it from the flange 22. The connecting arm 120, rollers 118, and threaded connection 124 support the end cap 70 and allow it to be easily maneuvered. To move the end cap 70, all of the pins through the holes 24 in the flange 22 and through the holes 73 in the end cap 70 are disengaged either from their respective nuts or hydraulic devices and the end cap 70 is slid or moved to the left as shown in FIG. 6. By pulling on the end cap 70, the connecting arm 120 moves axially and is supported between the rollers 118. The end cap 70 is then rotated out of the way by turning the same which, in turn, rotates the turntable 114. Then, the tubular housing 18 presents its open end 20 allowing access to the opening 19 of the housing 18. Connection of the end cap 70 to the flange 22 is achieved by performing the reverse operation to that discussed above.

A method of treating fluid contained in the gas cylinder 12 is also provided. Generally, the method comprises the steps of first supporting the cylinder 14 within the tubular housing 18 having the open end 20. Next, the open end 20 of the tubular housing 18 is sealed. Finally, the fixture 16 is removed from the cylinder body 14 to allow the fluid to exit the cylinder body 14 into the tubular housing 18. The fluid is then removed from the housing 18 and treated in the scrubber assembly 96.

More specifically, the cylinder body 14 having the removable fixture 16 thereon contains a known hazardous and/or unknown fluid which is typically a gas. The diameter of the cylinder body 14 is obtained by measuring the same so that the proper height of the carriage assembly can be determined in order to center the cylinder body 14 and thereby the removable fixture 16 vertically in the opening 19 of the housing 18. Once the proper height is determined, the legs 38 are adjusted to the proper height relative to the lower carriage member 34 and upper carriage member 40 by placing pins 48 in the holes 46 in the lower carriage member 34, the holes 44 in the legs 38 and the holes in the upper carriage member (not shown). The cylinder body 14 is then positioned onto the V-shaped support surface 42 of the upper carriage member 40. The clamping assembly 30 is secured over the cylinder body 14. Securement of the clamping assembly causes the cylinder body 14 to be horizontally centered in the opening 19 of the housing 18 by centering the cylinder body 14 on the V-shaped support surface 42. The backstop assembly 50 is then placed on the rails 32 and positioned so that the upright support 54 engages the end of the cylinder body 14. The backstop assembly 50 is secured by placing the pins 62 through the holes 60 in the backstop assembly 50 and through corresponding holes 58 on the rails 32 to prevent axial movement of the cylinder 12.

As previously stated, by securing the cylinder body 14 with the clamp assembly 30 to the upper carriage member 40 which has already been adjusted to its predetermined height, the cylinder body 14 is automatically positioned in the center of the opening 19 of the housing 18 both vertically and horizontally. Securement of the backstop 50 to the rails 32 completes the locking of the cylinder 12 within the housing 18. That is, the cylinder 12 is secured to upper carriage member 40 by the clamping assembly 30 to limit relative rotational movement therebetween, and the cylinder 12 is secured by the backstop assembly 50 to prevent axial movement of the cylinder 12.

The open end 20 of the housing 18 is then closed. The turntable 114 is rotated so that the end cap 70 aligns with the open end 20 and, particularly the flange 22 of the tubular housing 18. The connecting arm 120 is then moved (to the right as viewed in FIG. 6) between the rollers 118 until the end cap 70, and gasket 71 engage the flange 22. The pins disposed through the holes 24 in the flange and through the holes 73 of the end cap 70 are secured either by using nuts or a hydraulic actuating mechanism.

As the connecting arm 120, and therefore, the end cap member 70 are moved toward the flange 22, the fixture engagement assembly 78 secured on the second end 76 of the shaft 72 engages at least a portion of the removable fixture 16. Because the shaft 72 is centered through the end cap 70, the shaft 72, and therefore, the fixture engagement assembly 78 are axially aligned with the removable fixture 16 of the gas cylinder 12 (FIG. 1). As was previously stated, the fixture engagement assembly 78 can comprise any configuration adapted for engagement with at least a portion of the fixture 16.

Once the assembly has been secured, an oxygen-free atmosphere is introduced into the opening 19 of the housing 18 through the gas inlet 94b by passing a gas such as nitrogen into the opening 19 of the housing 18. This can be accomplished in any well known manner. For example, all of the openings 94 can be initially closed. The gas inlet 94b is opened and the gas is forced into the interior 19 of the housing 18 until a predetermined pressure has been reached. Then the gas inlet 94b is closed and one of the other openings 94 is opened until the pressure in the interior 19 of the housing is relieved and the opening 94 is immediately closed. The gas inlet 94b is then reopened and the gas is forced into the opening 19 of the housing 18. This process is repeated until all of the oxygen has been removed from the interior 19 of the housing 18. By utilizing an oxygen-free atmosphere the risk of explosion is eliminated.

Once the oxygen free atmosphere is established, and all of the openings 94, 94a and 94b are closed, the motor driven gear box 86 is energized. The output shaft of the motor 86 rotates the shaft 72 through the series of sprockets 84, 88 and the belt or chain 90. This rotational movement of the shaft 72 is imparted to the fixture 16. The fixture 16 is thereby rotated relative to the cylinder body 14. Rotational movement of the cylinder body 14 is limited by the clamping assembly 30. That is, any rotational force applied to the cylinder body 14 tends to tighten the clamping assembly 30 which limits the rotational movement of the cylinder body 14. The shaft 72 is rotated by the motor driven gear box 86 until the fixture 16 has been removed from the cylinder body 14. Subsequently, the fluid, within the cylinder body 14 escapes from the cylinder body 14 and is containerized in the housing 18.

Once this has been completed, the fluid in the housing 18 can be firstly tested by carefully drawing a sampling of the material through the sample port 94a without exposing any fluid to the atmosphere. The sample is tested in a suitable assembly (not shown) to determine the makeup or consistency of the unknown fluid originally contained in the cylinder body 14. Once the consistency of the fluid is known, a suitable medium is placed in the treatment tank 104. Preferably, the medium is a fluid and will react with the fluid contained in the housing 18 to neutralize the fluid contained in the housing 18 and render it safe to the environment.

The fluid contained in the housing 18 can be evacuated through any one of the number of openings 94 by opening the proper valve 102. The fluid from the housing travels through the conduit 100, to the valve 98, and into the treatment tank 104 having the liquid therein. In the treatment tank 104, the fluid from the housing 18 is reacted to inert products which can be disposed of in a safe manner. Any residual fluid from the housing 18 having passed unreacted through the treatment tank 104 is then passed to the packed column 106 through the conduit 105 wherein it is further reacted in the usual manner to render the fluid inert and safe for disposal.

Alternatively, the fluid in the housing can first be reacted in packed column 106 and then reacted in the treatment tank 104. This process is not shown but is described in detail below. Specifically, the fluid contained in the housing 18 can be evacuated through any one of the number of openings 94 by opening the proper valve 102. The fluid travels through a conduit (not shown) into the packed column 106. In the packed column 106, the fluid from the housing 18 is reacted. Any residual (unreacted) fluid from the housing 18 having passed unreacted through the packed column 106 is then passed to the treatment tank 104 where it is further reacted in the usual manner, as described above.

Once most of the fluid has been removed from the housing 18, an inert atmosphere is again introduced into the opening 19 of the housing 18 through the gas inlet 94b by passing a gas such as nitrogen into the opening 19 of the housing 18. This can be accomplished in any well known manner, as described above. This process is repeated until all of the hazardous and/or waste fluid has been removed from the interior or opening 19 of the housing 18.

Once all of the fluid has been removed from the housing 18, the end cap 70 is removed in the above described manner. The cylinder body 14 and fixture 16 can each be separately removed from the housing 18. Because the fixture 16 was threadedly removed, the cylinder body 14 is unharmed, and can be reclaimed for possible reuse.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A treatment assembly (10) of the type for treating fluid contained in a gas cylinder (12) of the type which comprises a cylinder body (14) and a removable fixture (16) sealing the cylinder body (14), said assembly (10) comprising:
   a tubular housing (18) having an open end (20); gas cylinder support means (26) disposed within said tubular housing (18) for supporting the gas cylinder (12) at a predetermined position relative to said tubular housing (18);
   said assembly (10) further comprising fixture removal means (68) for sealing said open end (20) and said tubular housing (18) and for enabling relative rotational movement between the cylinder body (14) and a removable fixture (16) from outside said tubular housing (18) to remove the fixture (16) from the cylinder body (14) and allow the fluid to exit the gas cylinder (12) into said tubular housing (18).

2. An assembly as set forth in claim 1 further characterized by said fixture removal means (68) comprising; an end cap (70) for sealing said open end (20) of said tubular housing (18), and a shaft (72) having first (74) and second (76) end, said shaft (72) rotatably disposed through said end cap (70).

3. An assembly as set forth in claim 2 further characterized by said fixture removal means (68) further including fixture engagement means (78) on said second end (76) of said shaft (72) for engaging the fixture (16) of the gas cylinder (12) and rotating same relative to the cylinder body (14) in response to a force applied to said shaft (72).

4. An assembly as set forth in claim 3 further characterized by said gas cylinder support (26) means comprising; adjustable frame support means (28) for supporting the gas cylinder (12) at said predetermined position, and clamping means (30) operatively associated with said adjustable frame support means (28) for securing the gas cylinder (12) to said adjustable frame support means (78).

5. An assembly as set forth in claim 4 further characterized by said adjustable frame support means (28) comprising; a pair of rails (32) fixedly secured within said tubular housing (18) and disposed axially therein, and a carriage (34, 38, 40) slideably disposed on said pair of rails (32).

6. An assembly as set forth in claim 5 further characterized by said carriage (34, 38, 40) including; a lower carriage member (34) having a pair of surfaces (36) adapted for engaging said pair of rails (32), a pair of legs (38) extending upwardly from said lower carriage member (34) and adjustable relative thereto, and an upper carriage member (40) supported by said legs (38) and adjustable relative thereto.

7. An assembly as set forth in claim 6 further characterized by said upper carriage member (40) including a support surface (42) for receiving the gas cylinder thereon.

8. An assembly as set forth in claim 7 further characterized by said support surface (42) being generally V-shaped.

9. An assembly as set forth in claim 5 further characterized by said further characterized by said adjustable frame support means (28) further comprising back stop means (50) for limiting axially movement of the gas cylinder (12) in one axial direction within said tubular housing (18).

10. An assembly as set forth in claim 9 further characterized by said back stop means (50) comprising a base (52) for engaging said pair of rails (32) and an upright support (54) extending upwardly from said base (52) to contact the gas cylinder (12) and thereby prevent axial movement of same in one axial direction.

11. An assembly as set forth in claim 4 further characterized by said clamping means (30) comprising a pipe clamp for engaging the gas cylinder (12) and preventing rotational movement thereof with respect to said adjustable frame support means (28) in response to a force applied on said first (70) end of said shaft (72).

12. An assembly as set forth in claim 4 further characterized by said assembly including fluid removal means (92) operatively associated with said tubular housing (18) for removing the fluid from said tubular housing (18).

13. An assembly as set forth in claim 12 further characterized by said fluid removal means (92) comprising; an opening (94) through said tubular housing (18), and scrubber means (96) in fluid communication with said opening (94) for receiving the fluid from said tubular housing (18) and for treating the fluid.

14. An assembly as set forth in claim 13 further characterized by said scrubber means (96) comprising a treatment tank (104) in fluid communication with said opening (94) and a packed column (106) in fluid communication with said treatment tank (104).

15. An assembly as set forth in claim 13 further characterized by said fluid removal means (92) including a sampling port (94a) for allowing a sample of the fluid to be removed from said tubular housing (18).

16. An assembly as set forth in claim 12 further characterized by said tubular housing (18) including a flange (22) about periphery of said open end (20) and having a plurality of holes (24) therethrough, and said end cap member (70) having a plurality of holes (73) therethrough, said holes (73) of said end cap member (70) being aligned with said holes (24) of said flange (22), and said holes (24) of said flange (22) including a plurality of pins extending therethrough for disposition through said holes (73) of said end cap member (70) to fixedly secure said end cap member (70) with said flange (22).

17. An assembly as set forth in claim 16 further characterized by including sealing means (71) between said end cap member (70) and said flange (22) for preventing the fluid from escaping said tubular housing (18).

18. An assembly as set forth in claim 12 further characterized by including a motor driven gear box (86) for connection to said first end (74) of said shaft (72) to impart said force on said first end (74) of said shaft (72).

19. A method of treating fluid contained in a gas cylinder (12) of the type which includes a cylinder body (14) and a removable fixture (16) sealing the cylinder body (14) comprising the steps of:

supporting the cylinder (12) within a tubular housing (18) having an open end (20);

sealing the open end (20) of the tubular housing (18) with a fixture removal assembly (68); and manipulating the fixture removal assembly (68) from outside the tubular housing (18) to impart relative rotational movement between the cylinder body (14) and the removable fixture (16) to remove the fixture (16) from the cylinder body (14) and allow the fluid to exit the gas cylinder (12) into the tubular housing (18).

20. A method as set forth in claim 19 further characterized by removing fluid from the housing and treating the fluid in a scrubber assembly (96).

21. A method as set forth in claim 20 further characterized by utilizing a scrubber assembly (96) including a treatment tank (104) in fluid communication with the tubular housing (18) and a packed column (106) in fluid communication with the treatment tank (104).

22. A method as set forth in claim 21 further characterized by removing the fixture (16) from the cylinder body (14) by imparting relative rotational movement between the fixture (16) and the cylinder body (14).

* * * * *